Aug. 21, 1945.   J. GALAMB ET AL   2,383,185
RANGE FINDER
Filed May 23, 1942   4 Sheets-Sheet 1
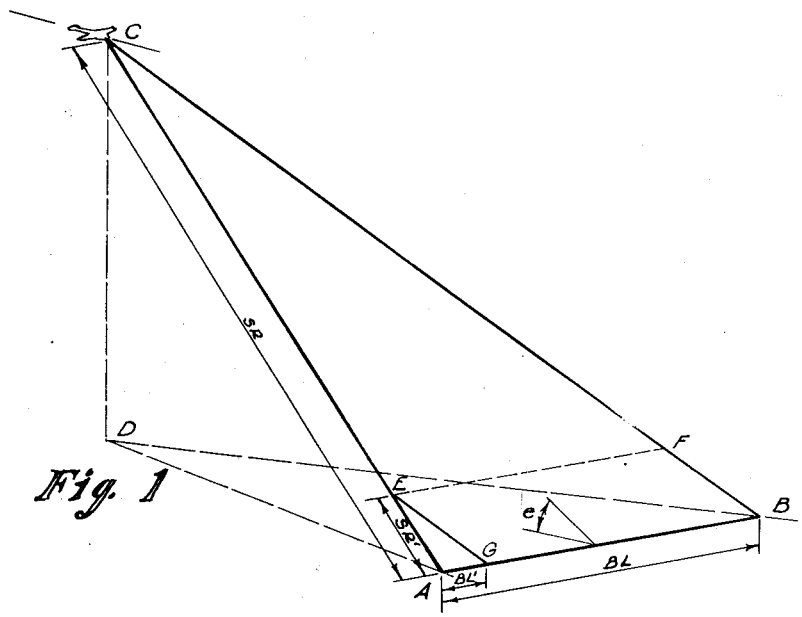
Fig. 1
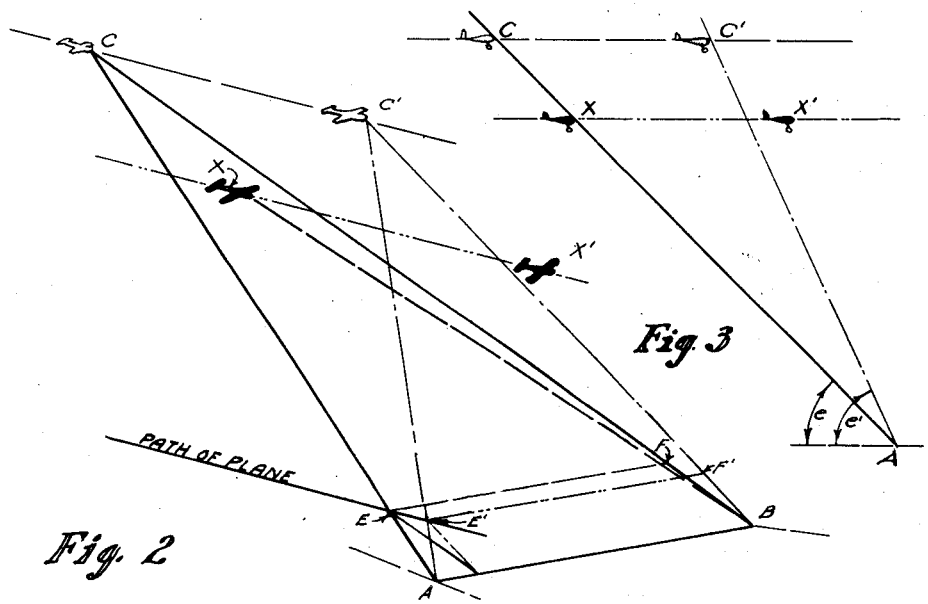
Fig. 2
Fig. 3
INVENTORS
J. Galamb, H. J. Chubbuck
and A. O. Roberts
BY E. C. McRae and
Robert C. Harris.
ATTORNEYS.

RANGE STATION

OUTPOST

Aug. 21, 1945.   J. GALAMB ET AL   2,383,185
RANGE FINDER
Filed May 23, 1942   4 Sheets-Sheet 4

INVENTORS
J. Galamb, J. A. Chubbuck
and A. O. Roberts
BY E. C. McRae and
Robert A. Harris
ATTORNEYS.

Patented Aug. 21, 1945

2,383,185

UNITED STATES PATENT OFFICE 2,383,185

RANGE FINDER

Joseph Galamb, Detroit, and Albert O. Roberts and Horace A. Chubbuck, Dearborn, Mich., assignors to Ford Motor Company, Dearborn, Mich., a corporation of Delaware Application May 23, 1942, Serial No. 444,292

1 Claim. (Cl. 33—66)

This invention relates to range finding devices; and, more particularly, to a method and an apparatus for the exact determination of target positions in the minimum of time by the correlation of two station observations. The conventional range finder is not especially suitable for antiaircraft fire control because the small size of the target and its rapid three-dimensional movement in space require sighting and measuring apparatus which may be operated to give range data in a shorter time than is possible with such finders. The data to be observed include the present azimuth, the present elevation and the height or slant range of the target. These in turn must be computed and corrected in the director to give the angle of traverse, the quadrant elevation and the fuse setting for transmission to the gun. Much ingenuity has been exercised in the design and construction of the director mechanism to make due allowance for all ballistic conditions and the change in position of the target, but in the final analysis the effectiveness of fire depends upon the accuracy and speed with which the initial data readings are obtained. The invention herein described gives such data with greater accuracy than heretofore obtainable and at a speed far in excess of the conventional range finder.

Our invention consists of a new method and device to find the instantaneous slant range of a moving target and to transmit this data continuously to the gun director so that the gun may be set and fired while the target is still within range. It is based upon the two-station method in which observers are placed at opposite ends of a known base line, preferably 2,000 feet or so in length. Observations of the approaching target are taken from these remote points and correlated to obtain the range which is transmitted to the control station for correlation and application to the gun.

It has long been recognized that the two-station method with its long effective parallax is theoretically and intrinsically more accurate than any method used with self-contained instruments, but the complications which arose from the necessity for accurate placement, communication to the control center and means for assured mutual target identification prevented its application in any practical form.

In our installation we employ a base line of about 2,000 feet with observing stations positioned at each end. An observer at each station is equipped with a sighting telescope which is trained by means of cross hairs on the target, and the slant range is transmitted directly to the gun director. One obstacle overcome in this system was the difficulty of being assured that both observers and their sighting instruments were trained on the same target. When a flight of aircraft approaches and the observers are a considerable distance apart, they view the target from widely different angles. One observer may direct his instrument to one ship in the formation, while the other observer, even though informed of the first observer's action, will not be sure that he has his instrument directed toward the same target. Under the most advantageous circumstances, it is difficult to correlate these readings and when the readings must be taken at night, as is most frequently the case, the chance of the observers bearing on different targets is increased. Moreover, the data is valueless unless the readings are absolutely correlated in point of time.

A further difficulty lies in the fact that both observers must track the target independently. Hence, even with the best intercommunication, a considerable time may elapse before both of the observers are certain that they are on the same target. These and other disadvantages of the two-station system have prevented its widespread acceptance despite the increased accuracy which it offers. These will be explained more fully in the description of the method and the apparatus which follows and it will be made clear how this invention eliminates these difficulties.

The apparatus employed in our improved range finder consists of two medium-powered telescopes which are mounted on horizontal trunnions at the range station and outpost, respectively. These trunnions are in axial alignment with each other and are electrically connected so that movement of the range-station scope moves the outpost scope in exact synchronism. Both scopes, swinging in vertical arcs and being in synchronism, thus direct both observers at the same angle of observation. The range-station operator alone controls this angle of elevation.

Each scope is pivotally mounted on vertical pivots positioned upon the aforementioned trunnions. Thus, the scopes may be swung laterally in the plane defined by the angle of elevation of the trunnions. The lateral sweeps of the scopes are independent of each other but an outpost beam is pivotally mounted on the range-station trunnion with its axis parallel to but spaced a short distance from the vertical axis of the range-station scope. The outpost beam and outpost scope are electrically connected so that lateral movement or sweep of the outpost scope will cause similar movement of the outpost beam.

In short, the position of the range-station trunnion defines the elevation of the plane in which both scopes move, while the position of the range-station scope on its vertical axis and the position of the outpost beam define the arcs through which the range-station and outpost scopes, respectively, are pointed. The angle of parallax is thus the angle between the range-station scope and the outpost beam.

Both scopes are provided with conventional cross hairs for training the scopes on a particular target. The essence of our invention is that this apparatus creates a prescribed plane of observation for both observers, which plane is established by only the range-station observer and insures that the target which he selects is in the plane of both scopes. The other observer is thereafter forced to continue his observations in the plane so chosen which is continuously changed by the first observer to maintain the target within it.

In operation, the range-station operator trains his scope on a group of planes so that one plane is centered on the cross hairs. He then follows this plane and gives the outpost operator a "go ahead" signal. The outpost operator then swings his scope laterally until the group of planes comes into view. The plane which is centered on the range-station cross hairs will be aligned with the horizontal hair on the outpost scope so that the outpost operator need only adjust his scope to center same on this plane to insure that both operators are training their instruments on the same target. Other planes may pass through the horizontal cross hair of the outpost scope but only the plane selected by the range-station operator will remain aligned with this cross hair. This not only simplifies the method of operation but also allows the operators to pick up the same target almost at a glance.

While our invention is especially suitable for use in directing anti-aircraft fire, it is nonetheless useful in directing long-range fire on relatively stationary objects such as ships, etc. The instantaneous readings and computation obtained with the device are more valuable in connection with aircraft work but the extreme accuracy obtained is of great importance against any type of target.

The invention may be used with a shorter base line, making it adaptable for use on shipboard. One station may be placed at each end of the ship with the base line extending practically the whole length of the boat.

Our invention comprises these features, together with the arrangement, construction and combination of the various parts of our improved device, as described in the specification, claimed in the claim and illustrated in the accompanying drawings in which:

Figure 1 is a perspective schematic view showing the trigonometrical relations between the two stations and the target.

Figures 2 and 3 are perspective and elevational schematic representations, respectively, showing the method of assured mutual target identification.

Referring now to Figure 1, a two-station arrangement is shown in which A and B are the range station and outpost, respectively, and the distance BL between them represents a carefully measured base line. C is the target and the lines AC and BC are the sight-angle lines from the observation stations to the target.

In this apparatus, the transverse trunnions of the sighting instruments are axially aligned on AB, and ABC is a plane which includes the base line and the target, this plane making an elevation angle $e$ with the horizontal. The dotted lines DB and DA indicate the horizontal traces of the sight lines, and CD the altitude of the target.

In operation, the observer at A sights his instrument on the target C. The plane angle $e$ of the instrument at A is transmitted to the instrument at B, which is automatically synchronized to the same plane angle. The instrument at B can thus only be moved in the same target plane in which the instrument at A is functioning. Each instrument is free for independent side-angle movement in the target plane to establish the sight angles CAB and CBA from the two points of observation to the target. The sight angle of the instrument at B is transmitted and compared with that at A by erecting EG parallel to BC at the extremity of BL', which is a known fixed distance. EAG is the A sight angle and EGA the B sight angle and triangle EAG is similar to triangle CAB. As the lengths of BL and BL' are known, the slant range SR is directly proportional to SR' which is easily measurable. This quantity SR is transmitted directly to the director and is the slant range of the target.

Figures 2 and 3 show how mutual identification is assured in this system. Plane ABC represents, as in Figure 1, the plane established from station A and in which the observer B is forced to make his observation. In this instance, observer A sights on the target C. It may occur, however, that target X is also in the field of view of observer B. When target X is exactly in plane ABC, it will be aligned with this cross hair. However, as the target C moves to the position C', A follows it with his instrument and continuously changes the datum plane to that represented by ABC'. B, all of this time, is forced to limit his observations to the successive planes established by A and hence will speedily find that the target X, which he has sighted upon, either disappears from his field of view or at least becomes out of alignment with the horizontal cross hair of his scope. Inasmuch as both target X and target C are in the observers' field of view and target C stays on the horizontal cross hair while target X passes through or away from this cross hair, B immediately knows that target C is the one to train his vertical cross hair upon.

This may be better described by referring to

Figure 4:
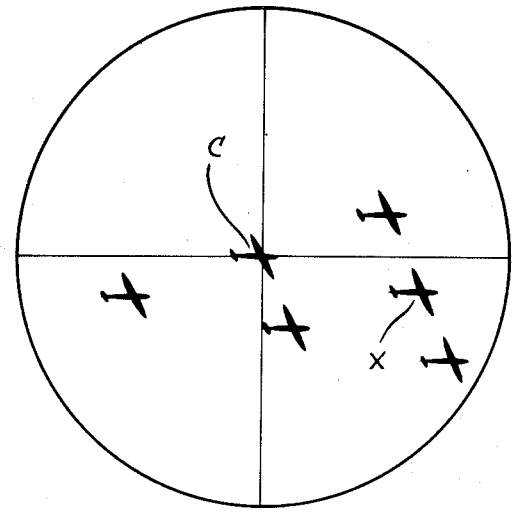
Figure 4 is a diagrammatic view of the range-station telescope's field, showing one target of a group centered on the cross hairs.
Figure 5:
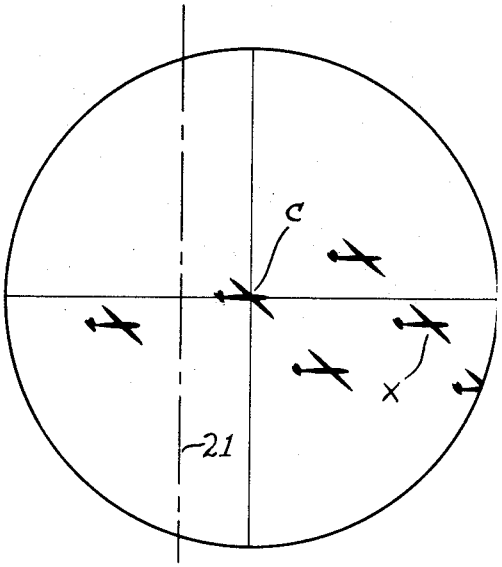
Figure 5 is a diagrammatic view of the outpost scope's field, showing the same group of targets but viewed from a different position and illustrating the position of the particular target on the horizontal cross hairs.
Figure 6:
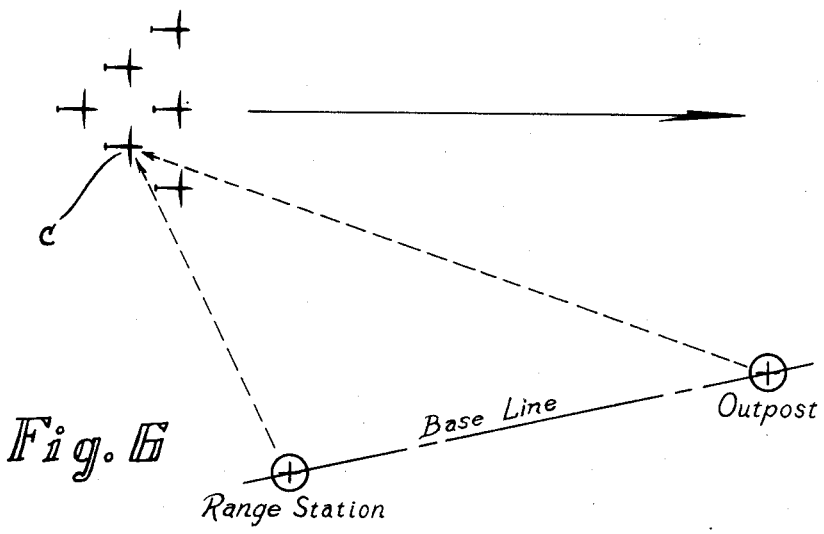
Figure 6 is a diagrammatic plan view of the positions of the range station, outpost and targets from which the views shown in Figures 4 and 5 are taken.

Figures 4 through 6. The target C is shown in Figure 4 as viewed by the range operator. He moves his scope in both directions enough to keep this target on the intersection of the cross hairs. This insures that the target C, as viewed by the outpost operator in Figure 5, will remain some place on the horizontal cross hair. The outpost vertical cross hair may not intersect this target, as shown by dot-and-dash line 21, but the outpost operator may readily correct this by moving his scope to the solid line position shown. The outpost operator has no alternate in distinguishing the target C from the target X or from others among the group because target C is the only one which remains on the horizontal cross hair. Other targets may approach the horizontal cross hair and even pass through the same but will not remain aligned with this cross hair. This feature alone makes the operation of our device so extremely fast that it may be satisfactorily used in tracking fast moving targets such as airplanes or the like. No other long-base range finder known to the applicants accomplishes this result.

Figure 7:
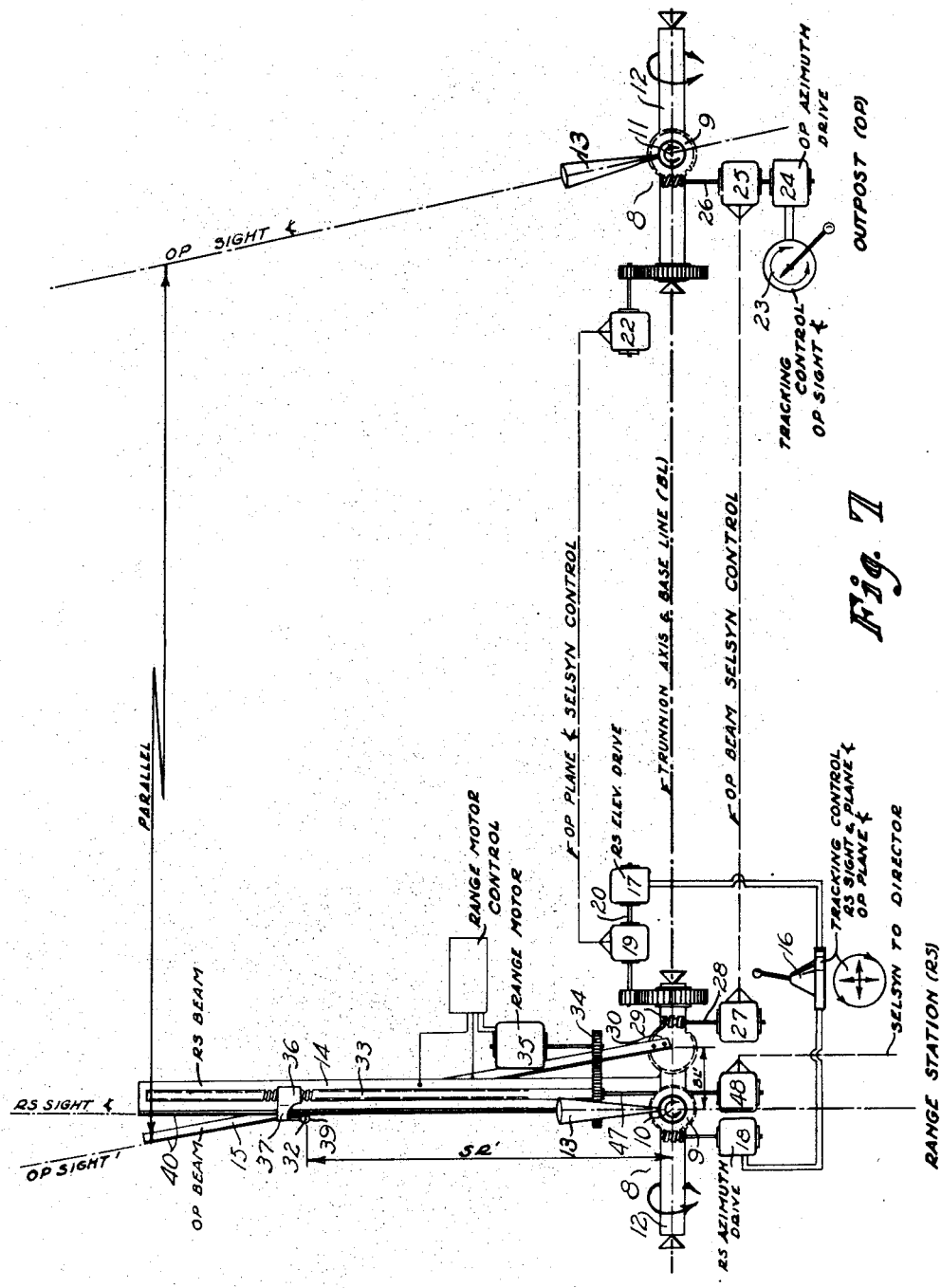
Figure 7 is a diagrammatic view, showing the arrangement of the observation stations and the communications therebetween.

One practical arrangement for carrying out our invention is shown in Figure 7, in which numerals 10 and 11 designate the range station and outpost, respectively. At each of these stations is a sighting instrument 8 which has a horizontal trunnion 12 arranged at the extremities of the base line BL and axially aligned with it. On each of these trunnions and at the ends of the measured base line are the scopes 13, which are mounted on rotatable scope tables 9 set on an axis normal to that of the trunnion. Aligned with the range-station scope 13 at all times is the range-station index beam 14, while an outpost-station index beam 15 is also carried on the range-station trunnion 12 and is electrically controlled, as will be more fully explained, so that it is always parallel to the outpost sight angle.

A tracking control 16 is provided in the form of a universally mounted electric switch which controls both an elevation drive motor 17 which is geared to the trunnion 12 to change the elevation or plane angle of the scope 13 and also the motor 18 which is geared to the scope table 9 to change the sight angle of the scope. It will thus be seen that by manipulation of the tracking control 16, the elevation and azimuth of the range-station scope 13 may be changed as the operator desires until it is aligned with any target and may thereafter be kept in alignment with this target.

A Selsyn transmitter motor 19 is connected to the shaft 20 between the elevation drive motor 17 and the trunnion 12. This Selsyn transmitter 19 is electrically connected to Selsyn repeater 22 at the outpost station, which repeater is geared to the outpost trunnion 12. As the operator at range station sights on the distant target, the Selsyn transmission equates the angular position of the trunnions at both stations and continuously maintains them at the same angle. This establishes the observation plane in which the range-station operator has determined the target to be, and to which the outpost operator must confine his observations for a possible target.

While the operator at B has no control over his plane of operation, he does have a tracking control 23 with which he can change the line-angle position of his scope 13. By "line angle" is meant the angle of the scope in the sight plane. A motor 24 is geared to the scope table 9 and is actuated by the control 23. By operating the control 23, the outpost operator may sweep with his scope the sight plane established by the operator A until he finds therein a target which remains in the plane so established. He thereafter follows it by proper manipulation of tracking control 23. As this is done, the continuously changing position of outpost scope 13 operates Selsyn transmitter 25 on the shaft 26 joining the azimuth drive motor 24 and scope table 9. This continuous change in scope position, which correspondingly designates the outpost sight angle, is transmitted from Selsyn 25 to the Selsyn repeater 27 at the range station. Repeater 27, operating through a shaft 28 and worm 29, rotates the index wheel 30 which is rotatably mounted on the trunnion 12 on an axis parallel to that of the scope table 9 and a known distance BL' from it. The outpost index beam 15 is secured to the index wheel 30 and moves with it in response to the sight angle data transmission from the outpost. It is thus apparent that this Selsyn connection transmits any change in the sight-angle position of the outpost scope to the range station and records it there instantaneously in the angular position of the outpost index beam 15, which remains parallel at all times to the outpost sight angle.

As the operators continue the tracking of the target, the outpost beam 15 and the range-station beam 14 assume various positions, depending upon the angle established by each operator. Now, as pointed out above, the base line distance BL has been established by measurement; and the distance between the centers of the index wheel 30 and the scope table 9 represents a corresponding side of a similar triangle. Thus, the distance SR' between the point of intersection of the beams 14 and 15, as indicated by 32, and the table axis, as it continuously changes, is directly proportional to the slant range between the range station and the target chosen at any moment.

While this distance SR' could be measured and the slant range computed in an ordinary way, it is apparent that for the purpose of present-day fire control, means must be provided for continuous automatic computation and transmission of the data to the fire control station. This is obtained by the means best shown in Figures 8 and 9. Corresponding parts of beams 14 and 15 are shown arranged as at any given point in the tracking operation and intersecting at 32. A screw 33 is mounted on beam 14 and is selectively rotated in either direction through the gearing 34 by the reversing range motor 35. Engaging this screw 33 is a carrier 36 which is slideably mounted upon beam 14 and which has an arm 37 extending therefrom. A lever 38 is pivotally connected to the arm 37 and a contact pin 39 is fixed to the lower end of the lever. A spring 39a urges the lever and pin 39 toward the adjacent edges of the beams 14 and 15. A contact strip 40 is insulatingly attached to the adjacent face of each of the beams. The beams are insulated from each other and from the ground; consequently, whenever the contact pin 39 is in contact with both of the strips 40, it is at the point of intersection 32 between the two beams and determines the instantaneous value SR'. Therefore, if this contact pin is automatically maintained so that it is in contact with both of these strips at all positions of the beams, and the corresponding longitudinal position of the carrier 36 transmitted, the data so obtained is at once reducible to the slant range desired. The range motor 35, suitably controlled, will, by the rotation of the screw 33 in either direction, cause the carrier 36 to move in or out along the beam to maintain the desired contact with both of the strips.

Figure 8:
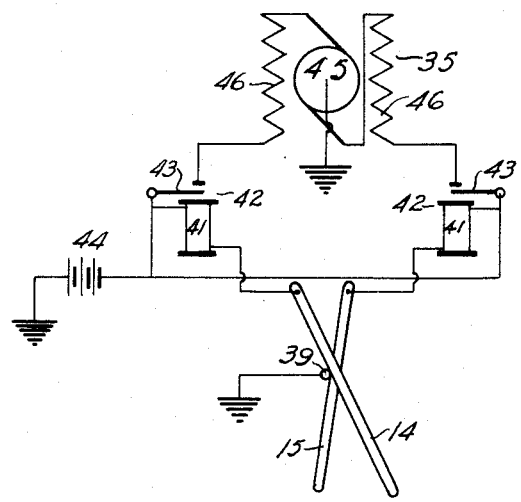
Figure 8 is a diagrammatic view of the wiring system in the range-motor control.
Figure 9:
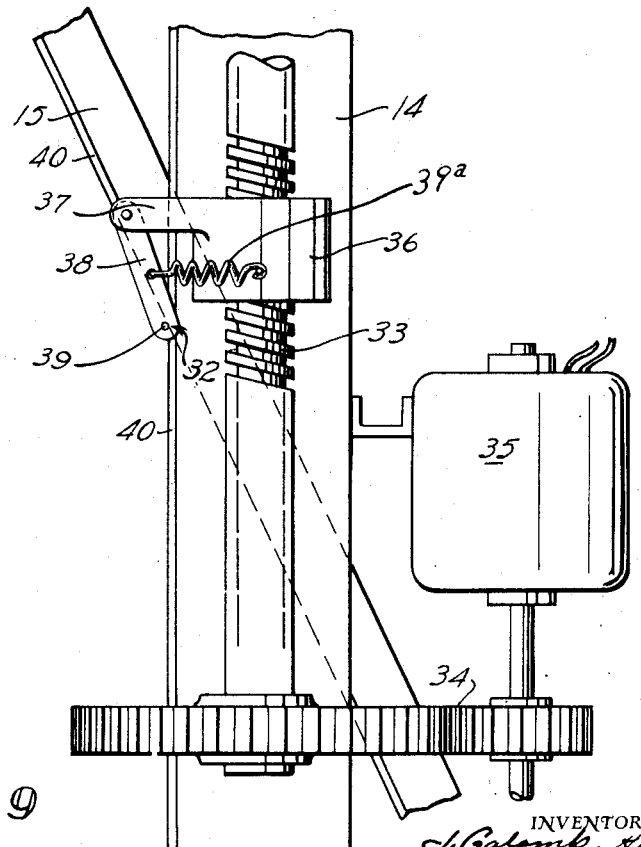
Figure 9 is a partial view of the range-station computing mechanism.

The hookup shown in Figure 8 automatically provides this control. The range motor is of the type which may be operated selectively in either direction by the selective energizing of separate fields and is directionally controlled through the relays 42 whose energizing coils 41 are connected respectively to the range-station and outpost beams 14 and 15. The contact pin 39 is grounded, as is the motor armature 45, a one-wire system being used in this example. In the position shown, the pin 39 is in contact with both of the beams and hence both of the relays 42 are energized and the contacts represented by the relay arms 43 are broken. No current flows to either field 46 of the motor so that it is inoperative, and the contact pin stays at the point of intersection 32.

However, as both of the beams are continuously moving independently in the course of the tracking, it is apparent that their point of intersection continuously changes. The contact pin is normally held in resilient contact with the contact strip 40 on the range-station beam 14, but if the outpost beam 15, in Figure 5, is moved clockwise it would lose contact with the pin 39. On the other hand, if it were to move counterclockwise, it would push the pin to the left and out of contact with the range-station beam. In either case, the corresponding relay would be de-energized and the connection between the source 44 and the appropriate field would be made to operate the range motor so the carrier 36 would be returned to a position in which the contact pin would again make electrical contact with both of the contact strips.

It will be understood that this operation is continuous and automatic. It may be desirable to insert a slipping clutch in the drive between the motor 18 and the scope table 9 so that in case the outpost beam is moved faster than the range-station beam, binding between the beams and pin 39 cannot occur.

Returning to Figure 7, it will be noted that shaft 47 is an extension of the screw 33 and is connected to a Selsyn transmitter 48. This transmitter is suitably connected to the fire control director and transmits to it the rotational position of the screw 33. This is an exact index of the location of the carrier 36 and hence of the point of intersection 32, as represented by the contact pin which establishes the length SR'. Thus, the director is supplied at all times with data which represents the exact slant range of the target at any given instant. If the rate of change of the slant range is desired, a tachometer may also be operated by the repeater in the director, which will at once give the relative change in position of the target being observed for computation of future position of the target.

It will thus be seen that with the use of the present invention, the long base system is made practicable for speedy and accurate fire control. By having one of the operators establish the plane of sight and automatically transmitting this established plane to the other operator and limiting his observations to the plane so established and maintained by the first operator, the chance of misidentification of the target by the two operators is entirely obviated. Moreover, since the operator at the second station merely has to make his observations in a single plane, the time required for him to find and track the target found by the first operator is materially reduced. Provision is also made for continuous and instantaneous transmission of the line angle at the outpost station to the range station where it is reflected in the index established there. Inasmuch as it is apparent that the point of intersection between the indices at the range station is a measure of the slant range of the target, the exceedingly accurate automatic means provided for obtaining this reading for every position on the respective beams is of extreme importance. These readings so taken are continuously transmitted to the director. All operations of this device, with the single exception of the visual tracking controls at the range station and outpost, are automatic so that it is only necessary for the operator to look through his telescope and operate his respective tracking controls to establish the initial plane and to thereafter keep on tracking the target chosen. On account of the long base line used, which greatly extends the effective parallax of the device, the accuracy that may be achieved is truly phenomenal. As it is achieved automatically and continuously throughout without interruption of observations, the resultant data is current and truly represents the present position of the target at every point during the operation of the device. When this is transmitted to the director, the operator may be assured that the data is reliable and accurate beyond any hitherto obtainable.

Some changes may be made in the arrangement, construction, and combination of the various parts of this improved device or the steps of the method without departing from the spirit of this invention, and it is the intention to cover by the claim such changes as may reasonably be included within the scope thereof.

We claim as our invention:

In a range-finder instrument for use in a two-station system, a pair of beams pivoted at spaced points on a common base line and universally movable to represent, respectively, bearings taken from said stations, said beams including exposed longitudinal conductors and being normally insulated one from the other, a contact contacting normally at least one of said beams and contacting both of said beams only when said contact is at the point of intersection of said beams, a screw mounted on one of said beams, a carriage on said screw supporting said contact, a motor to rotate said screw selectively in either direction to move said carriage in or out along said beam, an electrical connection between said contact and said motor, said connection being operable when said contact is in contact with but one of said beams to operate said motor in one direction and when said contact means is in contact with the other of said beams to operate said motor in the other direction and when said contact means is in contact with both of said beams at their point of intersection said motor to be inoperable.

JOSEPH GALAMB.
ALBERT O. ROBERTS.
HORACE A. CHUBBUCK.